(12) United States Patent
Graefenstein

(10) Patent No.: US 7,117,973 B2
(45) Date of Patent: Oct. 10, 2006

(54) NOISE SUPPRESSOR APPARATUS FOR A GAS DUCT

(75) Inventor: Andreas Graefenstein, Karlsruhe (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/871,521

(22) Filed: Jun. 21, 2004

(65) Prior Publication Data

US 2005/0016792 A1 Jan. 27, 2005

Related U.S. Application Data

(63) Continuation of application No. PCT/EP02/13548, filed on Nov. 30, 2002.

(30) Foreign Application Priority Data

Dec. 22, 2001 (DE) ................................ 101 63 812

(51) Int. Cl.
  F01N 1/06 (2006.01)
  F01N 1/08 (2006.01)
  F01N 1/12 (2006.01)
  F01N 1/02 (2006.01)

(52) U.S. Cl. ........................ 181/253; 181/279; 181/280

(58) Field of Classification Search ................ 181/253, 181/250, 279, 280, 273, 276, 266
See application file for complete search history.

(56) References Cited

U.S. PATENT DOCUMENTS

| 1,236,987 | A | * | 8/1917 | Schmitt | 181/253 |
| 2,247,130 | A | * | 6/1941 | McCurdy | 181/239 |
| 2,359,365 | A | * | 10/1944 | Katcher | 181/280 |
| 3,113,635 | A | * | 12/1963 | Allen et al. | 181/252 |
| 3,580,357 | A | * | 5/1971 | Whitney | 181/227 |
| 3,655,011 | A | * | 4/1972 | Willett | 181/228 |
| 3,913,703 | A | * | 10/1975 | Parker | 181/206 |
| 4,050,539 | A | * | 9/1977 | Kashiwara et al. | 181/280 |
| 4,669,068 | A | * | 5/1987 | Klatt | 367/83 |
| 4,683,978 | A | * | 8/1987 | Venter | 181/280 |
| 5,971,097 | A | * | 10/1999 | Etheve | 181/227 |
| 6,364,055 | B1 | * | 4/2002 | Purdy | 181/279 |
| 6,554,100 | B1 | * | 4/2003 | Kim | 181/279 |
| 6,796,403 | B1 | * | 9/2004 | Laughlin | 181/279 |
| 2005/0011700 | A1 | * | 1/2005 | Dadd | 181/279 |

FOREIGN PATENT DOCUMENTS

| DE | 19543967 |   | 5/1997 |
| EP | 1070903 |   | 1/2001 |
| FR | 602160 |   | 3/1926 |
| JP | 57119120 | A * | 7/1982 |
| JP | 60222516 | A * | 11/1985 |
| JP | 02309095 | A * | 12/1990 |
| JP | 06147624 | A * | 5/1994 |
| JP | 09177539 | A * | 7/1997 |

* cited by examiner

Primary Examiner—Edgardo San Martin
(74) Attorney, Agent, or Firm—Crowell & Moring LLP

(57) ABSTRACT

A sound damping device (4) for a tubular duct (2), particularly a gas transporting tract of an internal combustion engine (1) having a least one bypass channel (5) running parallel to a main duct (6) in a section of the duct (2). The bypass channel (5) is longer than the main duct (6) between a branching off point (7) and a re-entry inlet (8). The bypass duct according to the invention is configured as a spiral duct (5) which winds around the centrally disposed main duct (6) in order to decrease the installation space requirements for the noise suppressor (4).

14 Claims, 3 Drawing Sheets

NOISE SUPPRESSOR APPARATUS FOR A GAS DUCT

CROSS REFERENCE TO RELATED APPLICATIONS

This application is a continuation of international patent application No. PCT/EP02/13548, filed Nov. 30, 2002, designating the United States of America, and published in Germany as WO 03/056223, the entire disclosure of which is incorporated herein by reference. Priority is claimed based in Federal Republic of Germany patent application no. DE 101 63 812.4, filed Dec. 22, 2001.

BACKGROUND OF THE INVENTION

This invention relates to an apparatus for noise suppression in a tubular channel, in particular a gas-carrying channel of an internal combustion engine.

Published German patent application no. DE 195 43 967 A1 describes a device for suppressing intake noise of an internal combustion engine which has a pulsating operation, in which a bypass channel is provided, running parallel to a main channel with a greater distance between a branch and an opening into the bypass channel in a segment of the tubular intake channel. The longer bypass tube should be arranged in the manner of an interference pipe, whereby the length of the bypass tube and the length of the main channel of the intake line which is parallel to it are constructed with dimensions such that noise from harmonics of an interfering noise frequency are suppressed due to interference. The known bypass tube ends at one end at an acute angle which is open in the direction of flow of the intake air and at its other end it opens into the intake tubular channel at an obtuse angle, or preferably at a right angle.

Published European patent application no. EP 1,070,903 A1 describes a device of this general type in which a curved bypass channel is provided, branching off from the tubular channel at a right angle and opening back into the tubular channel at a right angle again at the end of the segment. The interference suppressor described here forms a three-peak suppression curve at the design frequency, resulting from the interference conditions. The dip in noise suppression down to less than 10 dB between the three peaks limit the broadband usability of this noise suppressor. Suppression values of at least 20 dB are necessary in such cases. This disadvantage is avoided by using two additional λ/4 pipes, the lengths of which must be designed for these frequency ranges.

French Patent FR 602,160 describes a spiral pipe system with different spiral pitches. The acoustic transit time difference produced in this way is proposed as the interference suppressor for exhaust systems. Here again, the transit time difference L of half the wavelength or an uneven multiple of half the wavelength of the frequency range to be suppressed amounts to $$d = 2 * L \frac{f_{mid}}{U}$$

where υ is the velocity of sound and d is the number of the lambda contained in 2*L because $$\frac{f_{mid}}{U} = \lambda.$$

An enhancement of the noise suppression effect is to be achieved by a multiple series connection, i.e., cascade of the same component.

The devices known from the prior art require a substantial amount of space to arrange the curved bypass channels, some of which extend a great distance away from the main channel. In addition, manufacturing the bypass channels is complex. In particular in noise suppression of internal combustion engines for motor vehicles, the available space is often very limited, so the known devices are too large and are not suitable for use with automobile engines.

SUMMARY OF THE INVENTION

It is an object of the present invention to provide an improved apparatus for noise suppression of a pulsating gas flow in a tubular channel.

Another object of the invention is to provide an apparatus for noise suppression which does not require an unduly large amount of installation space.

A further object of the invention is to provide an apparatus for noise suppression which can be manufactured with relative ease at reasonable cost.

It is also an object of the invention to provide an apparatus for noise suppression which is particularly suitable for use in automotive applications to suppress the noise of pulsating air flows in the air intake of the engine.

These and other objects are achieved in accordance with the present invention by providing a noise suppressor for a gas-carrying duct, comprising a main channel and at least one bypass channel connected in parallel with the main channel between a branching off point and a main channel re-entry point; the at least one bypass channel being longer than the main channel between the branching off point and the re-entry point; and in which the at least one bypass channel is configured as a spiral channel coiled in a helix around the main channel.

According to this invention, the bypass channel is designed as a spiral channel running in a helical pattern around a central axis of the main channel. The spiral channel, with its greater length between the location at which it branches off from the main channel and the location where it opens back into the main channel, may in this way be arranged in very close proximity to the main channel, so that the main channel and the bypass channel form a very compact assembly. The spiral channel is preferably arranged on the circumference of the main channel so that it is possible to achieve in just a few windings the required lengthening of the parallel spiral channel in relation to the centrally disposed main channel, which is essentially straight or extends with a slight curve between the branching off point and the point where the spiral channel opens back into the main channel. It is particularly advantageous that multiple spiral channels may also be provided, with the spiral channels being accommodated in the intervening spaces of the other spiral channels which are arranged to have an appropriate helical pitch.

With the spiral channels according to the invention, due to the differences in the transit times of sound waves in the longer spiral channels and the main channel, the sound spectrum in the tubular channel can be converted into out-of-phase pressure waves which can be suppressed easily. The combined passage cross section of the spiral channels is advantageously greater than the passage cross section of the main channel. The passage cross section of the spiral channel is coordinated with respect to the frequency band of the sound spectrum to be suppressed in the tubular channel. The spiral channels may have the same passage cross sections, but it is particularly advantageous for the spiral channels to be provided with different passage cross sections, these cross sections being selected so that they are "tuned" to the desired frequency ranges that are to be suppressed. The lengths of the individual spiral channels may also be tuned to the frequency range that is to be suppressed. The construction of the spiral channels according to the invention allows the respective segments of the spiral channels to be tuned to the sound spectrum to be suppressed in an especially space-saving manner by appropriately designing the helical pitch.

In this regard, the lengths of the main and secondary passages relative to one another must be designed very precisely. A design error of only a few millimeters can greatly weaken the desired suppression effect. The theoretical mid-frequency is valid here for exactly one bypass channel:

$$f_{mid} = \frac{340 \; m/s}{L2 * 2},$$

where L2 is the length of the main flow direction and the velocity of sound is 340 meters/sec.

The acoustic lengths of the channels are not identical to the geometric length of the component, so the ideal spiral lengths of the channels should be designed shorter than the theoretically calculated lengths. The geometric spiral length in this case may be constructed shorter by up to 14%, based on the acoustic length of the channels.

For four spiral bypass channels, for example, the formula requires a correction of the main acoustic length by a factor of approximately 1.7. A desired mid-frequency of 2.5 kHz then would not yield a main channel length of 68 mm, but instead it would be approximately 120 mm.

To prevent a dip in the noise suppression effect between the three suppression peaks, the present invention uses a variation of the cross-sectional areas of the main flow-through channel to the sum of the bypass flow-through channels. With a suitably small total spiral channel cross-sectional area relative to the cross-sectional area of the main tubular channel, the dips between the three suppression peaks disappear and the noise suppression may be pushed to well over 20 dB.

The noise suppression apparatus with spiral channels according to the present invention allows the noise suppressor to be designed as a broadband noise suppressor with a very compact design which can also be used for suppression of frequencies above 1000 Hz. In one advantageous embodiment of this invention, the main channel is formed by a central pipe with the spiral channels in contact with its outside surface. A low manufacturing complexity is required when the spiral channels are attached as half-shells to the central pipe, which is optionally a continuation of the tubular channel before the branching off of the spiral channels. The inlet and outlet openings of the spiral channels may be formed by apertures in the wall of the central pipe. It is especially advantageous for the inlet and outlet openings of the main channel and the spiral channels to be in a cross-sectional area of the tubular channel which has continuous flow. The spiral channels are thus parallel to the gas flow in the tubular channel and contribute fully toward a smaller pressure drop.

In another advantageous embodiment of the noise suppressor apparatus according to the present invention, for each spiral channel, a spiral band coiled about the central axis is inserted into the tubular channel, which forms an annular surface bounding the spiral channel and defines axially overlapping helical passages. The flat helical band is designed to be coiled in the radial direction to the central axis so that it is in contact with the inside of the tubular channel and borders the inside wall of the spiral channels in the radial direction. The helical bands of multiple spiral channels are arranged with offset angles of rotation in the circumferential direction of the tubular channel, with the desired flow-through cross section being adjustable via the angle of rotation in coordination with the frequencies to be suppressed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
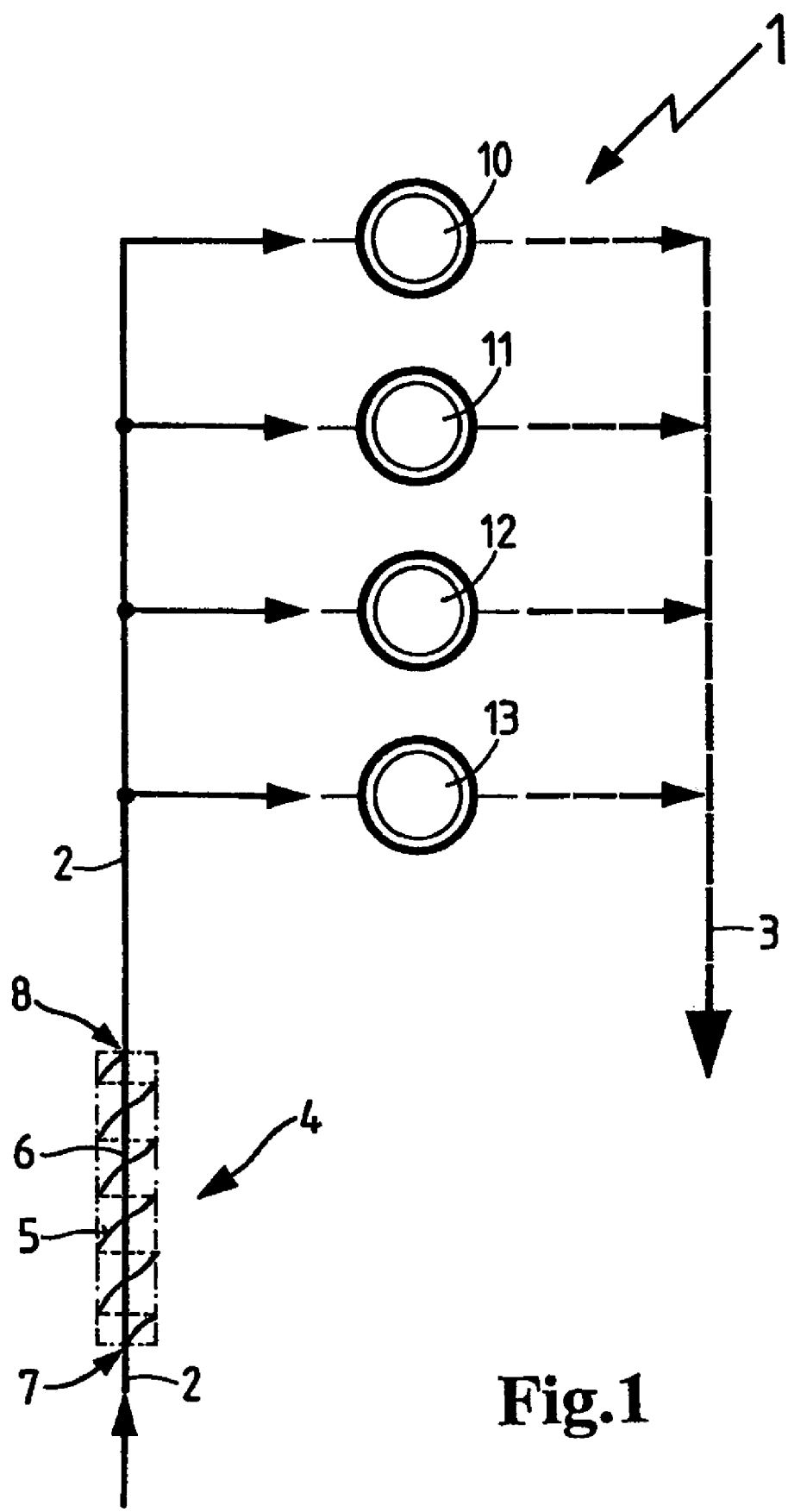
FIG. 1 is a schematic diagram of an internal combustion engine with a noise suppression device according to this invention in the engine air intake tract.

FIG. 1 depicts an internal combustion engine 1 with four cylinders 10, 11, 12, 13, each of which is supplied with fresh combustion air from a common air intake line 2. The exhaust gases from combustion in the cylinders 10 through 13 are discharged through an exhaust line 3. A device for noise suppression 4 of the noise generated in the tubular channel of the intake line 2 is arranged in the intake line 2. The noise suppression device 4 includes multiple parallel channels in a section between the branching off point 7 and the opening 8 which opens back into the tubular channel 2 where the parallel flow channels are brought together again. A main channel 6 is provided in this section, running essentially in a straight line between the branching of point 7 and the reconnection opening 8. Multiple bypass channels are provided in parallel with the main channel 6 and are constructed as spiral channels 5 having the form of a helix contacting the circumference of the main channel 6. Due to their helical design, the spiral channels 5 have a greater length than the main channel 6 between the branching off point 7 and the re-connection opening 8 in order to create differences in acoustic transfer time in the parallel tubular channels. In this compact design comprised of the main channel and helical bypass channels which lie closely adjacent the main channel, noise suppression is achieved by utilizing the interference effect.

Figure 2:
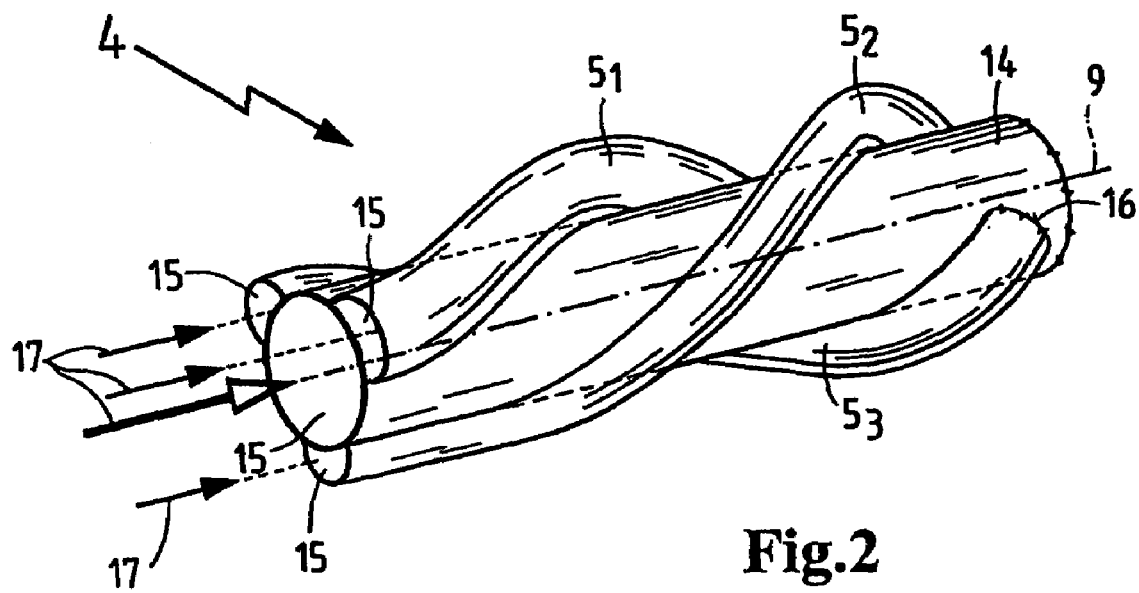
FIG. 2 is a perspective view of a noise suppression apparatus equipped with spiral channels according to the invention.

FIG. 2 shows one embodiment of the apparatus for noise suppression according to the invention in which the main channel is formed by a central pipe 14 constructed in a straight line, with three spiral channels $5_1$, $5_2$, $5_3$ in contact with the outside lateral surface of pipe 14. In this illustrative embodiment, the spiral channels are constructed as half-shells and are welded onto the outer surface of the central pipe 14. The outer wall of the central pipe 14 here forms part of the wall of the spiral channels $5_1$, $5_2$, $5_3$. In this advantageous representative embodiment, the total passage cross sections of the spiral channels $5_1$, $5_2$, $5_3$ which branch off from the passage cross section of the main channel in the central pipe 14 are larger than the passage cross section of the central pipe 14. Through a suitable choice of the passage cross sections and the lengths of the spiral channels $5_1$, $5_2$, $5_3$, the noise suppression effect of the apparatus according to the invention can be tuned as needed. The passage openings of the spiral channels $5_1$, $5_2$, $5_3$ of the broadband noise suppressor may differ from one another in order to be able to suppress the broadest possible frequency spectrum.

The lengths of the spiral channels $5_1$, $5_2$, $5_3$ can be selected through a suitable selection of the pitch of the helical winding of the channels about the central axis 9 of the central pipe 14. In the present illustrative embodiment, the inlet openings 15 are in a common oncoming flow cross section with the central pipe 14, In this way, the oncoming intake air flowing in the flow direction 17 is conducted through the noise suppression device to the combustion engine with a small pressure drop, with the inlet openings 15 which are situated advantageously in terms of flow making an effective contribution. In a corresponding manner, the outlet openings 16 of the spiral channels $5_1$, $5_2$, $5_3$ are designed accordingly in the area of the opening into the central pipe 14, with a common flow cross section being formed with the central pipe. The pitches of the helixes of the spiral channels $5_1$, $5_2$, $5_3$ are selected so that a lengthening of the effective path length of the spiral channels by approximately 200% in comparison with the distance in the central pipe 14 is obtained. Because of the hydrodynamically favorable design of the inlet openings 15 and the outlet openings 16 of the spiral channels $5_1$, $5_2$, $5_3$, a weakening of the noise suppression displacement effect on the frequency spectrum due to the Doppler effect at variable flow is prevented.

Figure 3:
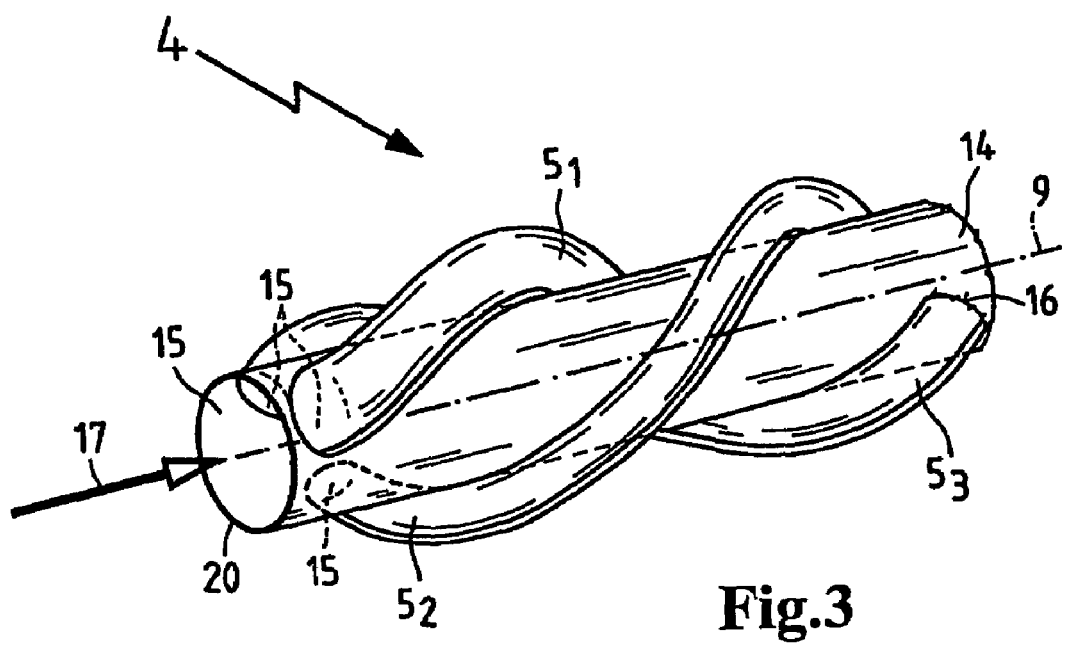
FIG. 3 is a perspective view of an alternative embodiment of the noise suppression apparatus according to the invention.

FIG. 3 shows a noise suppressor embodiment 4 according to the invention 4 with three spiral channels $5_1$, $5_2$, $5_3$ which are welded as half-shell elements on the circumference of the pipe wall 20 of the central pipe 14, with the inlet openings 15 and outlet openings 16 of the spiral channels $5_1$, $5_2$, $5_3$ being formed by apertures in the pipe wall 20. The pressure drop acting on the air 17 flowing through the noise suppressor segment is determined here only by the passage cross section of the central pipe 14.

The tuning of the noise suppressor 4 of the invention to the sound spectrum that is to be suppressed can be regulated by varying the passage cross sections of the spiral channels as well as by varying their lengths, whereby multiple spiral channels with different passage cross sections yield broadband behavior of the overall system. The adjustment of the length of the spiral channels, which preferably should correspond to twice the length of the central pipe, is determined by the pitches of the helixes of the spiral channels, with the choice of the suitable pitch of the spiral channels being made with reference to achieving a compact overall structure of the noise suppressor.

Because of the 3D effects, the lengths of the spiral channels of the noise suppressor differ greatly in comparison with the prior art and those of the design formulas known in the past. The effect depends on the complex 3D structure of the spiral noise suppressor and is established essentially through final correction of the channel openings which have an acoustic effect on both sides of the noise suppressor. It is found here that to design the mid-frequency, it is not the quotient of the velocity of sound to half the wavelength of the frequency to be selected that is used. Instead, a correction factor of the component length is necessary. For the geometric design investigated here, this amounts to 1.7%. The following table shows the differences in the effective mid-frequencies calculated for 3D (design frequency) in comparison with that of the component length given for the 1D design.

| | | |
|---|---|---|
| $f_{mid} = v/\lambda$ with $\lambda = 2*L_2$; $v$–velocity of sound, $L_2$—main path length | 2500 Hz | 1214 Hz |
| Prior art $L_{2\ Selamet\ Dickey}$ | 68 mm | 140 mm |
| Spiral noise suppressor 3D simulation $L_{2\ 3D\ Sysnoise}$ | 120 mm | 247 mm |

For the main channel length of a noise suppressor divided into four spirals, this yields a main length corrected by a factor of 1.76 for the mid-frequency design of the noise suppressor investigated here. The main length to be calculated for a required mid-frequency must be greater by this factor than that obtained from the known equation $$\left(L_{2\_Selamet\_Dickey} = \frac{U}{2*f_{mid}}\right).$$

Since the number of spirals and cross-sectional areas as well as the geometries of all the channels have a significant influence on the final correction in the opening and thus on the acoustic path lengths, the correction factor must be re-determined in each case if these variables change. However, it may always be assumed that the component length of the main channel must always be selected to be larger than that calculated from the known design formula.

The spiral design of the parallel secondary flow channels to the straight main channel (when used in intake lines of internal combustion engines) makes it possible to utilize the resulting spiral flow generated at the output of the spiral channels in combination with a downstream cyclone separator for purification of air. If the creation of spiral effects at the outlet of the spiral channels is not desirable, the spiral channels may be arranged around the central axis 9 of the main channel, each with different direction of winding.

Figure 4:
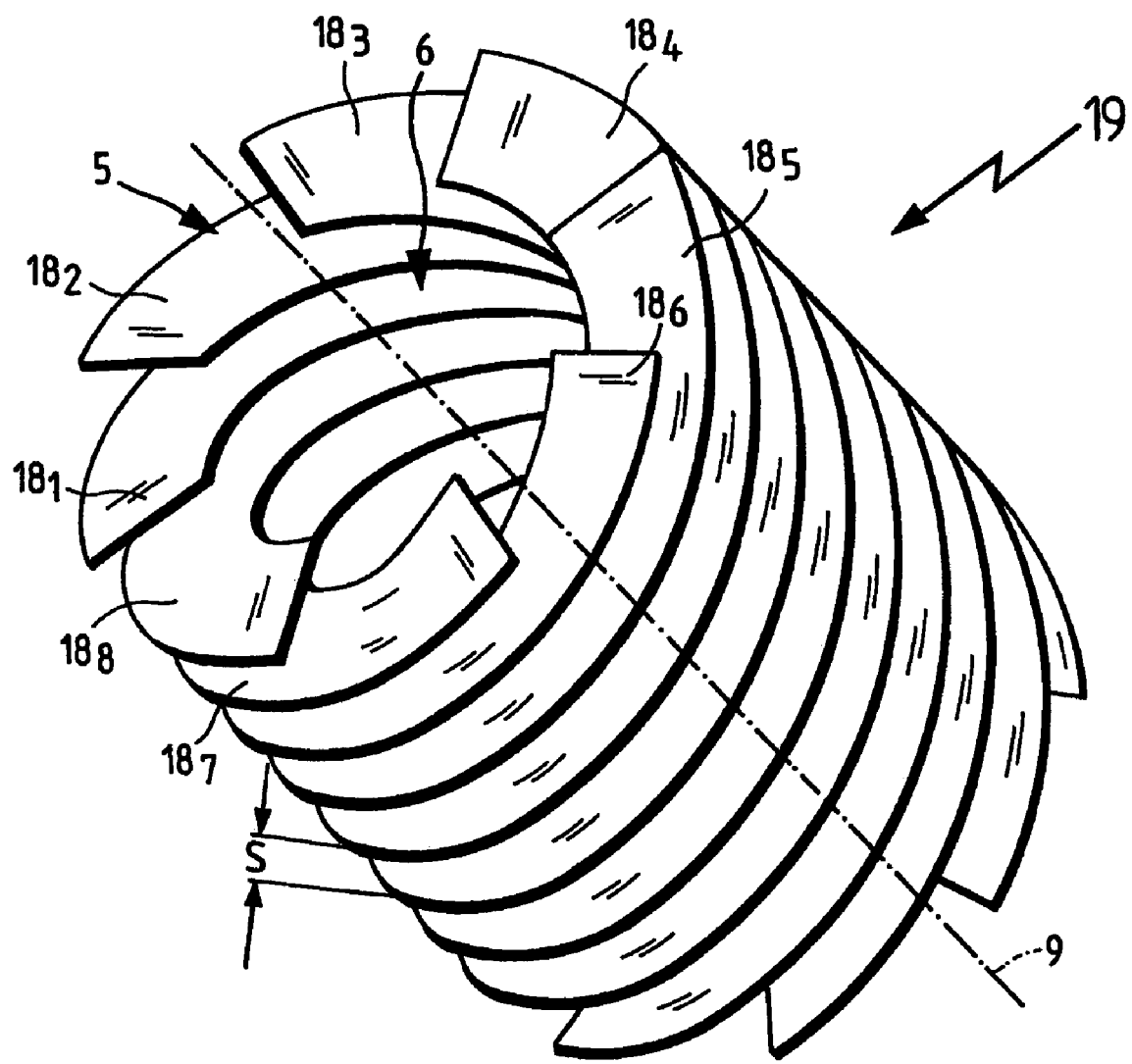
FIG. 4 is a perspective view of a noise suppressor component for forming spiral channels according to the invention.

FIG. 4 shows a noise suppressor component 19 for forming the spiral channels 5 in the intake line of an internal combustion engine, in which for each spiral channel, a helical band $18_1$ through $18_8$ is provided, which is coiled correspondingly in a spiral around the central axis 9 of the main channel. Each helical band $18_1$ through $18_8$ forms an annular surface with axially overlapping helical passages adjacent one another, with this annular surface corresponding to the total oncoming flow cross section of the spiral channels. The circular main channel 6 is formed in the central interior of the helical bands $18_1$ through $18_8$, and can be delimited spatially by insertion of a pipe. The coiled helical bands $18_1$ through $18_8$ are arranged with offset angles of rotation in the circumferential direction of the tubular channel, where the angle of rotation between two helical bands corresponds to the inlet cross section of a spiral channel bordered by these helical bands. If needed, a change in the frequency band to be suppressed can be achieved by varying the angle of rotation arrangement of adjacent helical bands, in which case it may also be advantageous to use helical bands of different pitches. In the present illustrative embodiment, helical bands of the same pitch are used, grouped in a uniform angle of rotation distribution about the central axis 9 of the main channel 6, whereby the axial height 8 of each spiral channel 5 is obtained from the pitch of the helical bands, taking into account the total number of helical bands.

In the installed state, the helical bands $18_1$ through $18_8$ are in contact with the inside wall of the tubular channel, which inside wall delimits the spiral channels in the radial direction. The helical bands may also be attached to a common mounting part and can thus be inserted as a combined noise suppressor component 4 in the tubular channel.

Since acoustic sound waves propagate over the shortest possible distance, a sufficiently fine subdivision of the secondary flow path into a suitable number of spiral channels is advantageous. If the subdivision is too coarse, the calculated length of the helical passage will be shortened. Changes in the length ratios of the lengths of the main channel and the spiral channels affect the design area of the frequency band to be suppressed, so that a fine subdivision into a plurality of spiral channels (eight channels in the embodiment shown) can be regarded as advantageous. The helical passage is designed based on the integral of a parameterized helical curve, the required helical pitch being obtained based on the constructive length of the noise suppressor component which is predetermined from the required noise suppression range in accordance with the given spatial conditions for installation of the noise suppressor.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A noise suppressor for a gas-carrying duct, comprising a main, channel and at least one bypass channel connected in parallel with said main channel between a branching off point and a main channel re-entry point; said at least one bypass channel being longer than said main channel between said branching off point and said re-entry point; and wherein said at least one bypass channel is configured as a spiral channel coiled in a helix around the main channel, wherein the main channel is formed by a central pipe with the spiral channels arranged adjacent the outside surface of said central pipe, wherein the spiral channels are defined by half-shells welded to the central pipe.

2. A noise suppressor according to claim 1, wherein said gas-carrying tubular channel is an air intake tract of an internal combustion engine.

3. A noise suppressor according to claim 1, wherein the spiral channel is arranged on the circumference of the main channel.

4. A noise suppressor according to claim 1, wherein a plurality of spiral bypass channels are provided coiled around the main channel.

5. A noise suppressor according to claim 1, wherein the spiral channels have a combined total passage cross section which is different from the passage cross section of the main channel.

6. A noise suppressor according to claim 1, wherein the combined total passage cross section of the spiral channels is greater than the passage cross section of the main channel.

7. A noise suppressor according to claim 4, wherein each spiral channel has a cross sectional area different from the cross sectional area of the other spiral channels.

8. A noise suppressor according to claim 4, wherein each spiral channel has a passage cross section tuned to a frequency band of a sound spectrum to be suppressed in the gas-carrying duct.

9. A noise suppressor according to claim 1, wherein the respective length of each spiral channel is tuned to a sound spectrum to be suppressed by appropriate selection of the pitch of the helix.

10. A noise suppressor according to claim 1, wherein inlet openings and outlet openings of the spiral channels are formed by apertures in the pipe wall of the central pipe.

11. A noise suppressor according to claim 4, wherein inlet openings of the bypass channels all like in a common cross-sectional plane, and the outlet openings of the spiral channels all lie in a second, common, cross-sectional plane of said duct.

12. A noise suppressor according to claim 1, wherein a plurality of helical bands is inserted into said gas-carrying duct, said bands being coiled about a central axis of the duct, said bands forming an annular surface comprised by an equal number of laterally adjacent spiral channels with axially overlapping pitches.

13. A noise suppressor according to claim 12, wherein said bands are arranged in contact with an inner circumference of said duct.

14. A noise suppressor according to claim 12, wherein said helical bands are mounted on a common noise suppressor component.

* * * * *